United States Patent
Xu et al.

(10) Patent No.: US 12,499,270 B2
(45) Date of Patent: Dec. 16, 2025

(54) METHOD AND SYSTEM FOR DELETING MULTI COPY PERSONAL DATA EFFICIENTLY AND SECURELY

(71) Applicant: HUAZHONG UNIVERSITY OF SCIENCE AND TECHNOLOGY, Wuhan (CN)

(72) Inventors: Peng Xu, Wuhan (CN); Runze Xu, Wuhan (CN); Wei Wang, Wuhan (CN); Yinjia Pi, Wuhan (CN); Tianyang Chen, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 107 days.

(21) Appl. No.: 18/603,202

(22) Filed: Mar. 12, 2024

(65) Prior Publication Data

US 2024/0330506 A1 Oct. 3, 2024

(51) Int. Cl.
*G06F 21/62* (2013.01)
*H04L 9/08* (2006.01)
*H04L 9/32* (2006.01)

(52) U.S. Cl.
CPC .......... *G06F 21/6245* (2013.01); *H04L 9/088* (2013.01); *H04L 9/3247* (2013.01)

(58) Field of Classification Search
CPC ........ G06F 21/60; G06F 21/604; G06F 21/62; G06F 21/6209; G06F 21/6218; G06F 21/6245; H04L 9/088; H04L 9/3247
See application file for complete search history.

(56) References Cited

U.S. PATENT DOCUMENTS

| | | | |
|---|---|---|---|
| 11,714,918 B1 * | 8/2023 | Kondal | G06F 21/604 726/30 |
| 12,147,564 B1 * | 11/2024 | Ma | G06F 16/162 |

(Continued)

FOREIGN PATENT DOCUMENTS

| | | |
|---|---|---|
| CN | 108418796 | 8/2018 |
| CN | 111092847 | 5/2020 |

OTHER PUBLICATIONS

Ateniese, Giuseppe, et al. "Provable data possession at untrusted stores." Proceedings of the 14th ACM conference on Computer and communications security. 2007.

(Continued)

*Primary Examiner* — Malcolm Cribbs
(74) *Attorney, Agent, or Firm* — Michael Ye; KALOS ATHENA WANG PLLC (57) ABSTRACT

A method and system for deleting multi-copy personal data efficiently and securely is provided, wherein the personal data and its subject identifier are signed and uploaded to data domains and stored as personal data copies; the personal data copies along with its source and destination data are circulated among the data domains; the data domain receiving a deletion instruction transmits the deletion instruction to every relevant data domains based on the identifier of the personal data subject and the destination data and then performs deletion; and after completing the deletion, the data domain deposit its domain identifier and feedback data it receives into a log, and feed the log back to its superior data domain. And the system of the present disclosure includes a plurality of data domains that can perform the above operations, thereby realizing association-based storage, association-based deletion and verification of association-based deletion of multi-copy personal data.

8 Claims, 6 Drawing Sheets

(56) References Cited

U.S. PATENT DOCUMENTS

| | | | | |
|---|---|---|---|---|
| 12,260,107 | B1* | 3/2025 | Wang | G06F 3/0652 |
| 2012/0324529 | A1* | 12/2012 | Rangachari | H04L 63/20 |
| | | | | 726/1 |
| 2021/0182240 | A1* | 6/2021 | Dongieux | G06F 9/542 |
| 2022/0029822 | A1* | 1/2022 | Ubbens | H04L 9/0891 |
| 2024/0421974 | A1* | 12/2024 | Ma | H04L 9/3066 |

OTHER PUBLICATIONS

Du Lln, et al. "Research on Associated Deletion Technology for Multi copy in Cloud and its Application" Xidian University, Jun. 2019.

Zhang Cui-ping, Guo Zhen-zhou and Gong Chang-qing. Study on Strategy of Replica Selection in Cloud Storage Environment[J]. Computer Science, 2015, 42(Z11): 408-412.

Dong Ji-guang Chen Wei-wei Tian Lang-jun Wu Hai-jia. Replica placement study in large-scale cloud storage system[J]. Journal of Computer Applications, 2012, 32(03): 620-624.

Xiong, et al. "Security sharing and associated deleting scheme for multi-replica in cloud" vol. 36 No. Z1 Nov. 2015.

Liu, et al. "Research on Timed Access of Sensitive Data Based on Dual Encryption" Journal of University of Electronic Science and Technology of China, vol. 46 No. May 3, 2017.

Wang-Wei-hua, et al. Journal of HuBei Adult Education Institute, vol. 13, No. Jun. 4, 2007.

\* cited by examiner

METHOD AND SYSTEM FOR DELETING MULTI COPY PERSONAL DATA EFFICIENTLY AND SECURELY

This application claims priority to Chinese Patent Application No. CN 202310330141.9 filed on Mar. 30, 2023, which is hereby incorporated by reference as if fully set forth herein.

BACKGROUND OF THE APPLICATION

Field

The present disclosure generally relates to security of cloud-based storage, and more particularly to a method and system for deleting multi-copy personal data efficiently and securely.

Description of Related Art

In order to improve user experience of personal data subjects, enterprises usually share personal data of personal data subjects with other internet-based service platforms or peer departments within their own organizations. In such a case, associated copies of the shared personal data exist in these service platforms or departments. When a personal data subject asks for deletion, the responsible enterprise has to delete all these copies to prevent a post-deletion breach or abuse of the personal data, thereby protecting the personal data. However, in the event that a personal data subject issues a request for deleting its personal data and associated copies while some platform or some initial data uploading party happens to have communication problems or stuck systems, the platform or any other parties holding copies of the shared personal data may be prevented from timely receive the request and fail to delete the copy it possesses as expected, and it is very likely that the personal data subject does not detect such a failure at all. This may turn out to be a seed of privacy breach or abuse of personal data.

Curtmola et al. took the lead to propose a bibliographic structure with provable security for recording multi-copy data. Nevertheless, their study made no consideration to complete deletion of multiple co-existing copies. Du et al. have provided an encryption solution named ADM, which achieves multi-copy deletion with reduced overheads for management of secret keys, and ensures complete deletion of multi-copy data and verifiability of deletion by means of key outsourcing.

Zhang et al. have constructed a multi-copy association model and deletion feedback mechanism, wherein deletion of an original file means deletion of all the associated copies listed in its copy directory, thereby enabling association-based deletion of multiple copies that are stored or shared in a distributed manner. Tian et al. and Xiong Jin-bo et al. also provide solutions for secure multi-copy deletion to address privacy breach in shared clouds. Wang Wei-hua from Hubei University and Liu Xin-zhong from University of Electronic Science and Technology of China proposed a scheme for association-based deletion of multiple copies designed for cloud storge by exploring multi-copy associating rules. The known scheme involves feeding back a list of files having contents associated with the file to be deleted to a personal data subject, and filtering copies of these files according to needs, thereby helping the personal data subject to achieve multi-copy deletion. Most of the known schemes for deletion of data are designed using cryptological technologies with the attempt to ensure that ciphertexts of personal data are unreadable and unrecoverable, instead of leaving the ciphertext data to be stored after the personal data itself has been deleted.

To sum up, there is a pressing need for an efficient method for association-based deletion of multi-copy personal data that enables complete deletion of multiple copies of personal data as requested by a personal data subject.

As a try to meet the need, China Patent Publication No. CN111092847A has provided a safe association-based deletion method. A data owner first encrypts data and then splits and packages the encrypted data into incomplete ciphertext copy association objects and ciphertext extraction and secret key objects. The ICRAO is shared with a cloud service provider. CESKO uses ABE attribute-based encryption. Afterward the key is shared and sent to the DHT network, for the data owner to maintain during the validity period of the data. Meanwhile, a copy correlation model is established to manage the copy generated during ICRAO migration and realize multi-copy correlation-based deletion. This known approach accomplishes multi-copy deletion using cryptography, such as increasing the number of keys for management of different copies. However, it makes the related system complex and is questionable in terms of complete deletion of data and verifiability of deletion.

China Patent Publication No. CN108418796A provides a method for integrity verification and association-based deletion of multiple cloud-data copies and a cloud storage system thereof. The method comprises: at a user side, randomly generating a data key to encrypt a file copy, simultaneously encrypting the data key by using a control key issued by a trusted third party, and outsourcing the key and a file ciphertext to a cloud end on the premise of ensuring security; and creating an association table of multi-copy cloud files, and using a cloud data integrity verification and association-based deletion strategy combining a Merkle Hash verification tree and a random deletion sequence pre-specified by the user. The existing method similarly accomplishes multi-copy deletion using cryptography and involves increasing the number of keys for management of different copies, also leading to a more complicated system. Besides, according to the known approach, completeness and verification of the deletion strategy necessitate cooperation from a third party in addition to the data owner and the data user, which means additional costs and resources for introduction of the third party and data communication with the third party, making the known approach costly to implement.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY

In view of the shortcomings of the existing art, the present disclosure provides a method for deleting multi-copy personal data efficiently and securely, being executed among data domains, the method comprises: signing and uploading the personal data and an identifier of a personal data subject to the data domains, so that the data domains store the personal data along with the subject identifier as personal data copies; having the personal data copies, with its source and destination recorded therein, circulated among the data domains; when any of the data domains receives a deletion instruction, having the data domain transmit the deletion instruction to all of the relevant data domains based on the identifier of the personal data subject and destination data in the personal data copy and perform deletion; and after the data domain completes the deletion, having the data domain deposit a domain identifier of itself and feedback data it receives into a log, and feed the log back to its superior data domain.

Currently, collection of personal data in the general network environment is not strictly controlled and derivative use of personal data collected by cloud platforms as service providers is so common that when a personal data subject requests a service provider to delete the collected personal data, it is almost impossible to ensure that all the shared copies of the data and other data derived therefrom are completely deleted, not to mention the longstanding risk that an unscrupulous cloud platform may try to unauthorizedly recover and reuse deleted entries.

With the method and system of the present disclosure, complete deletion of personal data can be ensured when a personal data subject requests a personal data processor to do so. Herein, complete deletion means that the deleted data can never be recovered by any other personal data subject or processor, and even post-deletion derivation of any historical data from is impossible, and that any copy derived from the data is deleted upon deletion of the data. This not only safeguards deletion of personal data but also effectively protects intellectual properties of personal data subjects in numerous practical applications.

Additionally, in the present disclosure, every data domain records the source and the destination of personal data and keeps a log for these records, having it possible to trace generation and propagation of each copy, thereby enabling accurate control of deletion of associated copies and determine whether there is anything about the personal data remaining after deletion.

Preferably, the method realizes association-based sharing, association-based deletion and verification of association-based deletion of multi-copy personal data using a storage protocol, a circulation protocol, an access protocol, and a deletion-and-deposit protocol configured in the data domains.

According to a preferred mode, the storage protocol comprises:
  Signing: performing a Hash operation based on the personal data and the identifier of the personal data subject, and using a private key of the personal data subject to perform a signature operation on a Hash value obtained through the Hash operation, thereby obtaining a digital signature; wherein the identifier of the personal data subject acts as a globally unique identifier.

Preferably, the storage protocol further comprises:
  Uploading: having the personal data subject upload the identifier of the personal data subject, the personal data, and digital signature to a data source domain that is the data domain acting as the source of the personal data; wherein the personal data copy stored in the data source domain as backup at least stores the identifier of the personal data subject, the personal data, the digital signature, a source domain identifier, and a destination domain identifier, wherein the source domain identifier and the destination domain identifier are initialized as empty; wherein the source domain identifier stores the identifier of the superior data domain from which the current data copy is circulated, and the destination domain identifier stores the identifier of the inferior data domain to which the current data copy is circulated.

According to a preferred mode, the circulation protocol comprises:
  Request: having the current propagation domain make a request to the superior domain for backup of the personal data copy based on the identifier of the personal data subject, and alter the source domain identifier and the destination domain identifier in the personal data copy backuped to the current propagation domain, wherein the source domain identifier is altered into the identifier of the superior domain, and the destination domain identifier is reset into empty; and
  Feedback: having the current propagation domain feed the destination domain identifier in the altered personal data copy and the domain identifier of itself back to the superior domain as feedback, so that the superior domain updates the personal data copy of the superior domain based on the feedback of the current propagation domain.

Preferably, the circulation protocol further comprises:
  Updating: the superior domain updates the personal data copy based on the feedback of the current propagation domain through: adding any domain identifier that exists in the feedback but does not exist in the destination domain identifier to the destination domain identifier; and
  repeating the step of feeding back and updating, until the data source domain completes updating.

According to a preferred mode, the access protocol comprises:
  Download: having the current propagation domain download the desired current data copy based on the identifier of the personal data subject;
  Verification: having the current propagation domain preliminarily analyze the current data copy so as to acquire the digital signature, and select the expected public key based on the identifier of the personal data subject to verify the digital signature; and
  Unsigning: if verification succeeds, having the current propagation domain unsign the current data copy so as to acquire the personal data.

According to a preferred mode, the deletion-and-deposit protocol comprises:
  Deletion request: having the personal data subject send the deletion instruction to the data source domain, so that the data source domain determines the personal data copy to delete based on the identifier of the personal data subject, and sends the deletion instruction to the directly associated data domain based on the destination domain identifier related to the personal data copy; and
  Deletion: having the current propagation domain receiving the deletion request identify the current data copy to delete based on the identifier of the personal data subject, send the deletion instruction to the directly associated data domain based on the destination domain identifier of the current data copy, and then delete the current data copy.

Preferably, the deletion-and-deposit protocol further comprises a log deposit, and the log deposit is for: if the destination domain identifier of the current propagation domain is empty, having the current propagation domain store the identifier of the personal data subject and the domain identifier of itself into the log; or if the destination domain identifier of the current propagation domain is not empty, having the current propagation domain store the identifier of the personal data subject, the domain identifier of the current propagation domain, and the domain identifier recorded in a deposited log that is fed back by the inferior domain to the current propagation domain, into the log.

Preferably, after the current propagation domain deposit the log, having it sign the deposited log using the private key of the current propagation domain, and feed back the signed deposited log to the superior domain; and having the superior domain unsign the deposited log using the private key of the current propagation domain so as to acquire the domain identifier in the log fed back by the current propagation domain.

The present disclosure further provides a system for deleting multi-copy personal data efficiently and securely, comprises a plurality of data domains, wherein data domains are configured to at least have the following protocols:

- a storage protocol, for signing and uploading the personal data and an identifier of a personal data subject to the data domains, so that the data domains store the personal data along with the subject identifier as personal data copies;
- a circulation protocol, for having the personal data copies, with its source and destination recorded therein, circulated among the data domains;
- an access protocol, for the data domain to perform verification and access on the personal data copy based on the identifier of the personal data subject; and
- a deletion-and-deposit protocol, for when any of the data domains receives a deletion instruction, having the data domain transmit the deletion instruction to all of the relevant data domains based on the identifier of the personal data subject and destination data in the personal data copy and perform deletion; and after the data domain completes the deletion, having the data domain deposit a domain identifier of itself and feedback data it receives into a log, and feed the log back to its superior data domain.

DETAILED DESCRIPTION

The present disclosure will be further detailed below with reference to accompanying drawings and particular embodiments.

Embodiment 1

The present disclosure provides a method for deleting multi-copy personal data efficiently and securely, being executed among data domains. The method provides: a storage protocol for signing and uploading the personal data and an identifier of a personal data subject to data domain; a circulation protocol, for circulating copies of the personal data among the data domains, and recording the identifiers of the circulation domains in the copies; an access protocol, for the data domain to perform verification and access on the personal data copy based on the identifier of the personal data subject; and a deletion-and-deposit protocol, for executing deletion of copies of the personal data and depositing records of the deletion. Based on the storage protocol, the circulation protocol, the access protocol, and the deletion-and-deposit protocol, the present disclosure achieves personal data multi-copy sharing, multi-copy association-based deletion and verification of association-based deletion.

Figure 1:
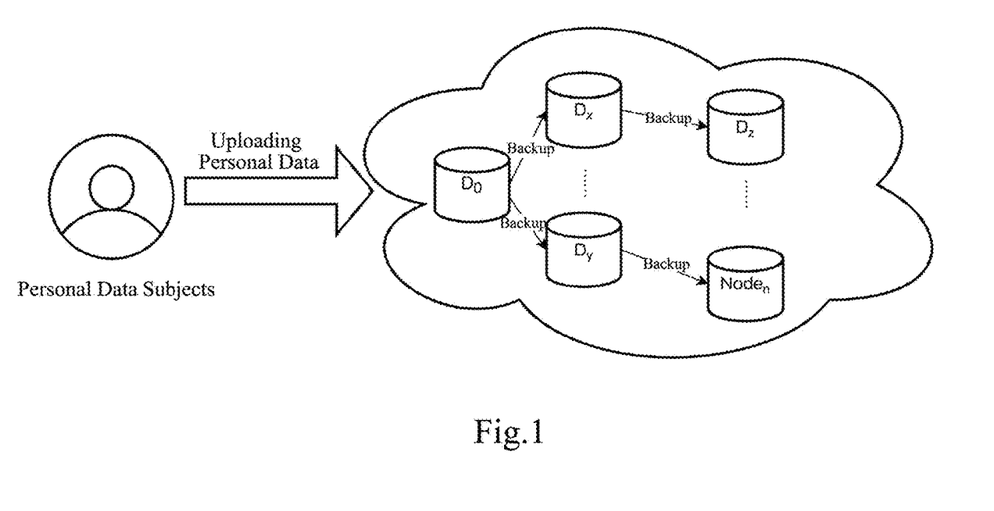
FIG. 1 is a schematic diagram illustrating storage according to the present disclosure.

The disclosed method is such designed that every data domain records data about each copy circulated thereto during sharing, backup, and circulation of multiple associated copies, thereby enabling subsequent association-based deletion of personal data copies stored in different data domains and verification to ensure that all the personal data copies have been deleted from the relevant data domains. Preferably, according to the schematic diagram illustrating the multi-copy association-based deletion method according to the present disclosure as shown in FIG. 1, for a certain personal data subject, the data domain D first receiving a personal data copy uploaded by the personal data subject is marked as the data source domain $D_0$ related to the personal data subject, while other data domains D are each marked as a propagation domain $D_i(i>0)$.

Preferably, as to the personal data copy from the personal data subject, a personal data copy completely packaged by the personal data subject is referred to as a personal data source copy. Such a personal data source copy, after uploaded to the data source domain, is saved by the data source domain as an initial personal data copy, denoted by $File_0$. The personal data copy acquired by a propagation domain is marked according to the serial number of the propagation domain. For example, the personal data copy stored in the propagation domain $D_9$ is denoted by $File_9$.

According to a preferred mode, the storage protocol at least comprises signing Signature( ) and uploading Upload( ).

Preferably, the identifier of the personal data subject UserID may be determined by the personal data subject based on the personal data, or may be randomly selected by the data domain as described in the present disclosure for the personal data subject.

Preferably, in the present embodiment, the globally unique identifier is configured as an identifier of the personal data subject UserID. In this case, signing Signature( ) is configured as:

Signature(Hash(UserID‖Data), SK)→Sig: the personal data subject performs a Hash operation on the personal data and the identifier of the personal data subject UserID using a Hash algorithm so as to obtain a Hash value Hash(UserID‖Data). The personal data subject uses its private key SK to perform a signature operation based on the Hash value Hash(UserID‖Data), so as to obtain a digital signature Sig related to the personal data and the identifier of the personal data subject UserID.

Specifically, encryption algorithms extensively used include asymmetric encryption algorithms, Hash algorithms, and symmetric encryption algorithms. Therein, SM3 is representative in Hash algorithms, and the signature algorithm used during the signature process is the asymmetric encryption algorithm SM2.

Preferably, a source domain identifier Sour is defined below. In the present disclosure, personal data is to be circulated among different data domains. A propagation domain asks for a personal data copy from a superior data domain associated thereto. For a given propagation domain, when the propagation domain is the current propagation domain, its superior data domain is the source domain with respect to the current propagation domain. The domain identifier of the source domain is a source domain identifier Sour.

Preferably, a destination domain identifier Des is defined below. In the present disclosure, personal data is to be circulated among different data domains. A propagation domain asks for a personal data copy from a superior data domain associated thereto. For a given propagation domain, when the propagation domain is the current propagation domain, the propagation domain from which the current propagation domain asks for the personal data copy is the destination domain with respect to the current propagation domain. The domain identifier of the destination domain is a destination domain identifier Des.

Further, uploading Upload( ) is configured as:

Uploading Upload (UserID, Data, Sig): the personal data subject sends the identifier of the personal data subject UserID, the personal data Data, and the digital signature Sig to the data source domain $D_0$. The data source domain $D_0$, based on the source domain identifier Sour and the destination domain identifier Des, stores the data just mentioned as the initial personal data copy $File_0$.

Preferably, the initial personal data copy $File_0$ contains: the identifier of the personal data subject UserID, the personal data Data, the digital signature Sig, the source domain identifier Sour, and the destination domain identifier Des, wherein the source domain identifier Sour and the destination domain identifier Des are initialized as empty.

Preferably, in a typical case, for a current propagation domain, its source domain identifier Sour records only one domain identifier, and the destination domain identifier Des records domain identifiers of all the propagation domains inferior to the current propagation domain.

Preferably, in a typical case, the source domain identifier Sour in the data source domain is denoted by NULL, to which a source domain is associated.

Preferably, in a typical case, the destination domain identifier Des associated to the current propagation domain without an inferior propagation domain is denoted by NULL.

According to a preferred mode, the circulation protocol at least comprises steps of request Request( ) feedback Feedback( ) and updating Modify( ).

Figure 2:
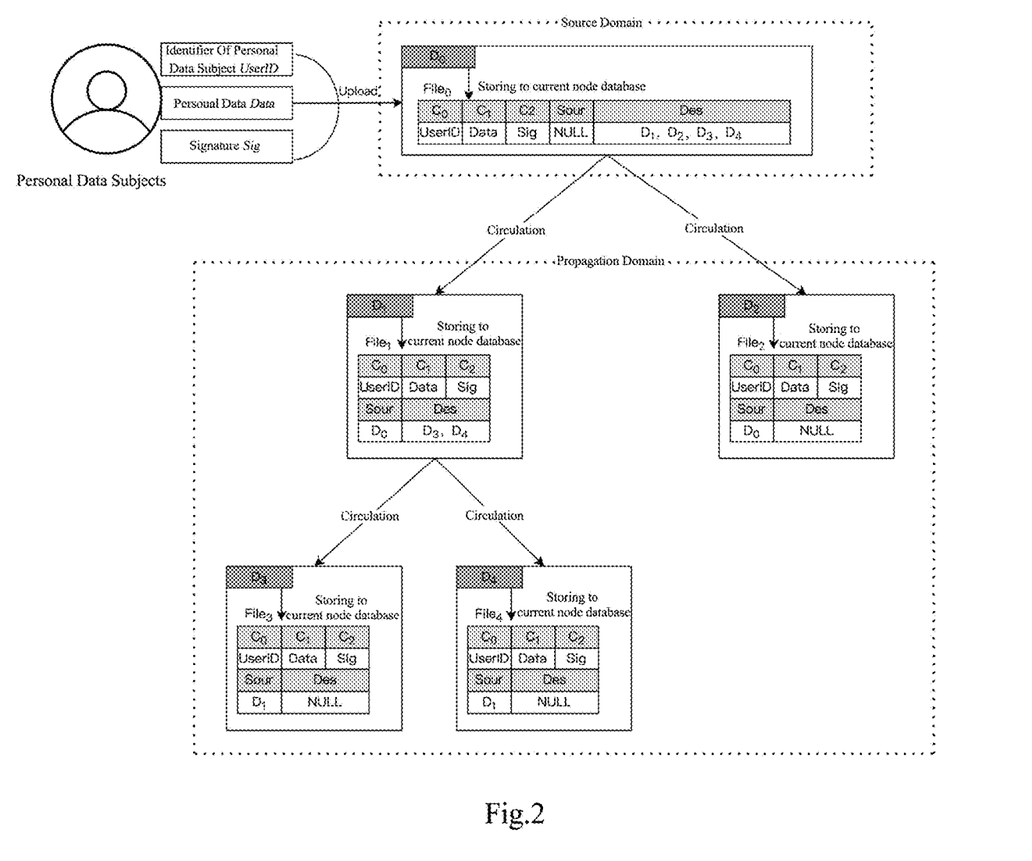
FIG. 2 is a schematic diagram illustrating circulation of associated copies according to a preferred mode of the present disclosure.

Preferably, in the present embodiment, based on the foregoing situation, for a certain propagation domain, when the propagation domain is denoted by the current propagation domain $D_i$, the source domain associated to the current propagation domain $D_i$ is denoted by $D_{i-1}$, and a destination domain inferior to the current propagation domain $D_i$ is denoted by $D_{i+1}$. As such, in the process of copy sharing according to a preferred mode of the present embodiment as shown in FIG. 2, the steps of request Request( ) and feedback Feedback( ) are configured as:

Request Request(UserID): the current propagation domain $D_i$ copies and backups personal data copy $File_{i-1}$ of the identifier of the personal data subject UserID based on the source domain $D_{i-1}$, and stores and update the related data into a node in the current propagation domain $D_i$ as $File_i$. The identifier of the personal data subject UserID, the personal data Data, and the digital signature Sig in the personal data copy File*t* of the current propagation domain $D_i$ are consistent to those in the personal data copy $File_{i-1}$ of the source domain $D_{i-1}$. The source domain identifier Sour is reset into $D_{i-1}$, and the destination domain identifier Des is reset into NULL.

Feedback Feedback(UserID, $D_i$): after the current propagation domain $D_i$ stores the personal data copy $File_i$, the current propagation domain $D_i$ feeds its own domain identifier and the destination domain identifier Des back to the source domain $D_{i-1}$. The source domain $D_{i-1}$, when receiving the feedback data, calls for the updating Modify( ) algorithm to perform related operations.

Updating Modify(UserID, $DA_i$, Des'): the source domain $D_{i-1}$ updates the destination domain identifier Des in its personal data copy $File_{i-1}$, wherein Des=Des+Des", Des"=(Des'∪$DA_i$)−Des, where Des is the destination domain identifier of the source domain $D_{i-1}$, Des' is the destination domain identifier of the current propagation domain $D_i$, $DA_i$ is the domain identifier of the current propagation domain $D_i$ itself, and Des" is a set of domain identifiers present in the set (Des'∪$DA_i$) and absent from the set Des.

According to a preferred mode, the access protocol at least comprises steps of downloading Download( ) verification Verify( ) and unsigning Decapsulate( ).

Preferably, when a propagation domain accesses a personal data copy of the personal data subject, it analyzes the copy to acquire the signature, and uses the public key of the personal data subject to verify the signature. If the two are the same, the verification succeeds. Otherwise, the result is invalid.

Figure 3:
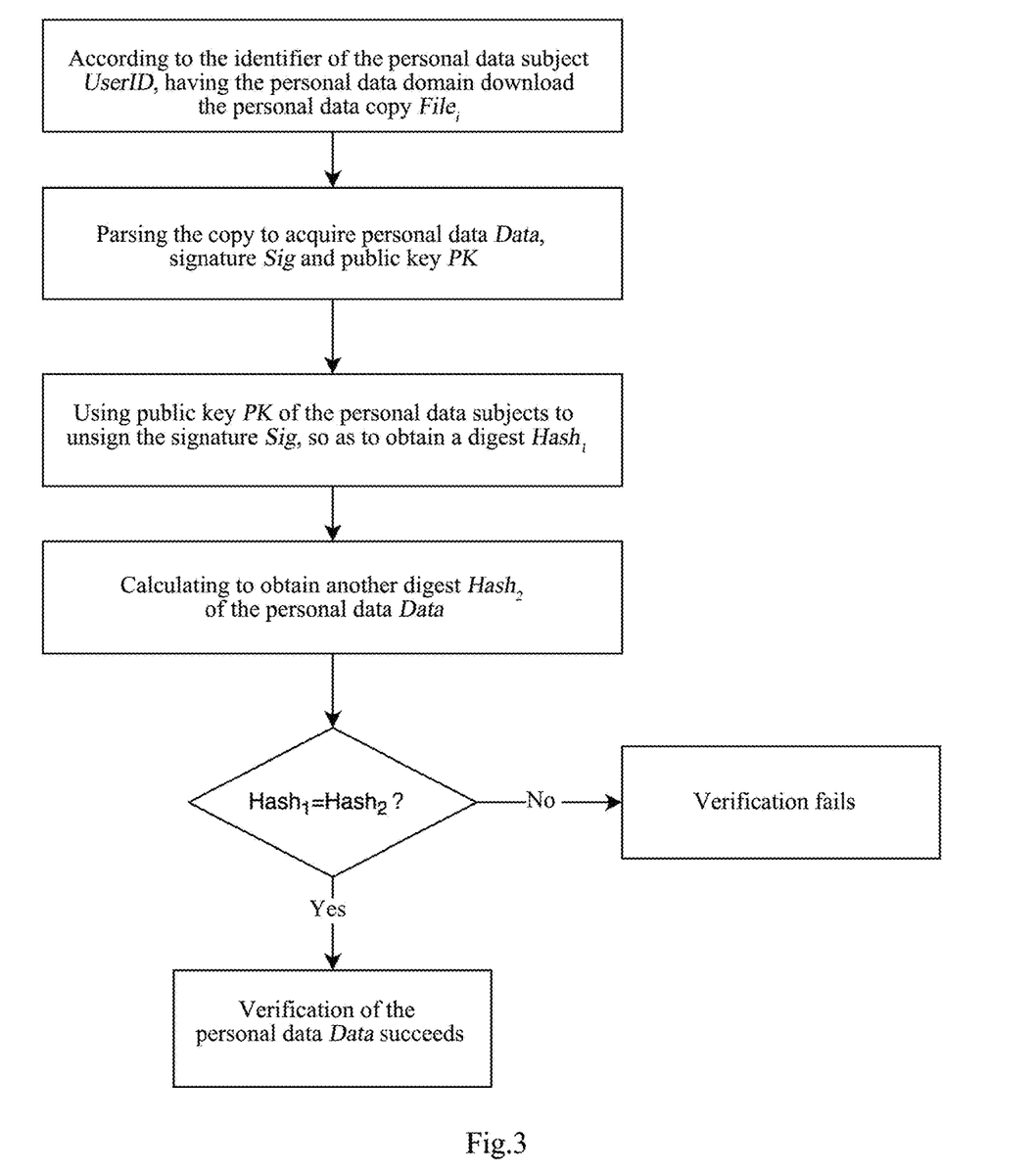
FIG. 3 is a flowchart showing access to associated copies according to a preferred mode of the present disclosure.

Preferably, in the present embodiment, based on the discussion above, FIG. 3 illustrates the access process according to a preferred mode of the present embodiment. The access protocol includes algorithms configured as:

Downloading Download(UserID): the current propagation domain $D_i$ downloads the expected personal data copy File; according to the identifier of the personal data subject UserID.

Verification Verify($File_i$): when the current propagation domain $D_i$ accesses the personal data copy $File_i$, the current propagation domain $D_i$ analyzes the personal data copy File; to acquire the digital signature Sig, and uses the public key PK of the personal data subject to verify the digital signature Sig.

Unsigning Decapsulate($File_i$): after the verification based on the Verify($File_i$) algorithm succeeds, the current propagation domain $D_i$ unsigns the personal data copy $File_i$ so as to eventually obtain the personal data Data.

According to a preferred mode, the deletion-and-deposit protocol at least comprises steps of deletion request DelReq( ), deletion Del( ), deletion deposit DelRecord( ), and deposit feedback DelFeedback( ).

Figure 4:
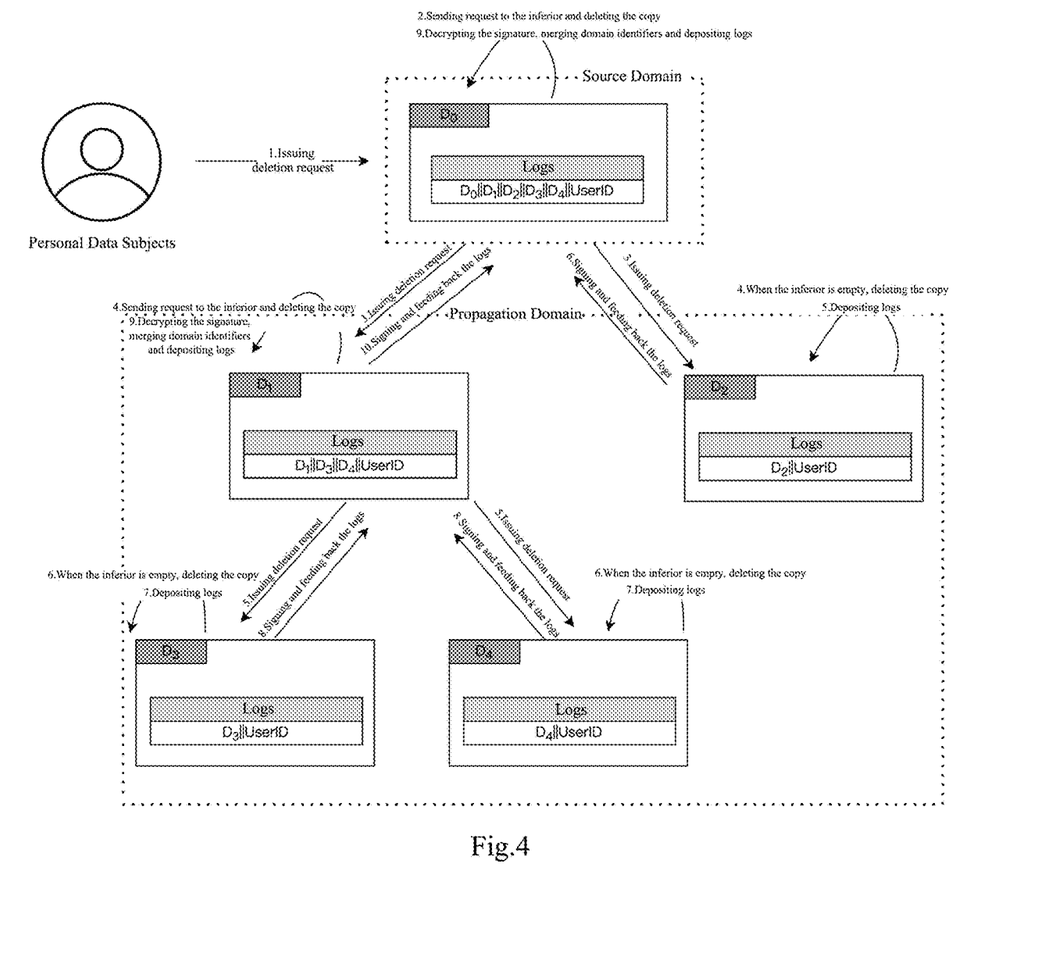
FIG. 4 is a schematic diagram illustrating deletion of associated copies according to a preferred mode of the present disclosure.

Preferably, in the present embodiment, taking log deposit for example, FIG. 4 illustrates the process of deletion and deletion deposit according to a preferred mode of the present disclosure, which is configured as:

Deletion request DelReq(UserID, Des, $File_0$): the personal data subject issues a deletion request. The data source domain $D_0$ receives the deletion request and sends the deletion request to the propagation domains directly associated in the destination domain identifier Des according to the identifier of the personal data subject UserID and the destination domain identifier Des, and then deletes the personal data copy $File_0$ in the data source domain $D_0$.

Deletion Del($D_i$, Des, $File_i$): each propagation domain $D_i(i>0)$ receiving the deletion request sends the deletion request to the destination domain directly associated in the destination domain identifier Des, and then deletes the personal data copy $File_i$. The operation is repeated until the destination domain identifier Des of the current propagation domain $D_i$ become empty.

Deletion deposit DelRecord(UserID, $DA_i$, Dlist): after the current propagation domain $D_i(i>0)$ completes deletion, it stores the identifier of the personal data subject UserID, its own domain identifier $DA_i$, and the domain identifier DList in the signature it receives from its inferior in the form of logs. If in the current propagation domain $D_i$ the destination domain identifier Des=NULL, the content of the log of the current propagation domain $D_i$ is $DA_i$‖UserID. If in the current propagation domain $D_i$ the destination domain identifier is not empty, the current propagation domain $D_i$ receives log feedback from the destination domain $D_{i+1}$. It uses the public key of the destination domain $D_{i+1}$ to decrypt the signature so as to obtain the feedback log DList‖UserID. As such, the content of the log deposited by the current propagation domain $D_i$ is $DA_i$‖DList‖UserID. Afterward, DelFeedback( ) is called for and used for subsequent operations.

Feedback of deposit DelFeedback( ): After the log is deposited, every domain signs and feeds back the contents of the log to the superior domain. Specially, for the personal data source domain $D_0$, this step is not performed.

Preferably, after deletion is completed, every domain stores the corresponding information of data structure as an operation log, for facilitating subsequent assessment and audit on the deletion operation. Every propagation domain signs and feeds back the contents of the log to its associated superior domain. The superior domain when receiving the signature performs verification, thereby ensuring that the source of the log is trustable.

Embodiment 2

The present embodiment provides improvements and supplements on the basis of Embodiment 1, so the description of similarities is not repeated herein. Particularly, in the present embodiment, the globally unique identifier is configured as the digest of the personal data Data. In other words, the globally unique identifier is configured as the logic file name LFN of the personal data Data. In the present embodiment, the data domain identifier is configured as the address of the data domain. Further, the data stored in the source domain identifier is the source address PLSA, and the content stored into the destination domain identifier is the destination address DA. Therein, the destination address is added into the destination address list $AddList_1$. In the present embodiment, deletion deposit is configured in the form of depositing the address list. Therein, in the process of depositing the address list, the step of adding the post-deletion data domain address to the deletion address list $AddList_2$ is conducted as below.

The present embodiment records the method for deleting multi-copy personal data efficiently and securely according to another preferred mode of the present disclosure. The method comprises:

providing a secure data domain D;

having the personal data subject package the personal data Data and upload the packaged personal data source copy File' to the data source domain $D_0$;

having different propagation domains $D_i$ access the personal data Data of the personal data subject by sharing the personal data copy $File_i$;

having every propagation domain $D_i$ record the source address PLSA and the destination address DA of the personal data copy $File_i$, and having every propagation domain $D_i$ when receiving the personal data copy File; feed its own address back to the superior source domain $D_j$, so that every source domain $D_j$ when receiving the feedback data from its inferior propagation domain $D_i$ alters the destination address list $AddList_1$;

when the personal data subject initiates a deletion request for deleting the personal data copy $File_i$, having the propagation domain $D_i$ send the deletion request to the propagation domains $D_i$ in the destination address list $AddList_1$ according to the stored destination address list $AddList_1$;

having every propagation domain $D_i$ delete the personal data copy $File_i$, package its own address and the address fed back by the inferior propagation domain $D_i$ into a deletion address list $AddList_2$, and feed the list back to the superior source domain $D_j$; and after the deletion is completed, having the data source domain $D_0$ compare the destination address list $AddList_1$ and the deletion address list $AddList_2$, so that if the two are the same, it means that the personal data copies File; have been completely deleted.

The present disclosure safeguards the right of the personal data subject to delete the personal data. In other words, even in the event of multi-copy data sharing where the personal data Data are authorized to a third party, it is assured that the data copy shared to the third party can be completely deleted upon the request of the personal data subject.

Preferably, for a certain personal data subject, the data domain D first receives the personal data copy uploaded by the personal data subject is denoted by the data source domain $D_0$ of the personal data subject, and the other data domains D are denoted by propagation domains $D_i(i>0)$.

Preferably, for a personal data copy of the personal data subject, the personal data copy completely packaged by the personal data subject is uploaded to the data source domain. The personal data copy kept by the data source domain is referred to as the initial personal data copy, denoted by $File_0$. The personal data copy acquired by the propagation domain is marked according to the serial number of the propagation domain itself. For example, the personal data copy stored in the propagation domain $D_9$ is denoted by $File_9$.

Preferably, the secure data domains include the data source domain $D_0$ and propagation domains $D_i$ inferior to the data source domain $D_0$.

Preferably, the personal data subject, the data source domain $D_0$, and the propagation domains $D_i$ are trusted. The personal data subject is the creator of the source personal data Data, and is absolutely trusted. The data source domain $D_0$ and the propagation domains $D_i$ will not actively disclose their own private keys and the personal data Data they receive during circulation. Communications among the propagation domains $D_i$, between the data source domain $D_0$ and the personal data subject, and among the data source domain $D_0$ and the propagation domains $D_i$ are secure. A secure communication protocol among them is set in advance for them to recognize messages and instructions from each other and execute operations accordingly.

Figure 5:
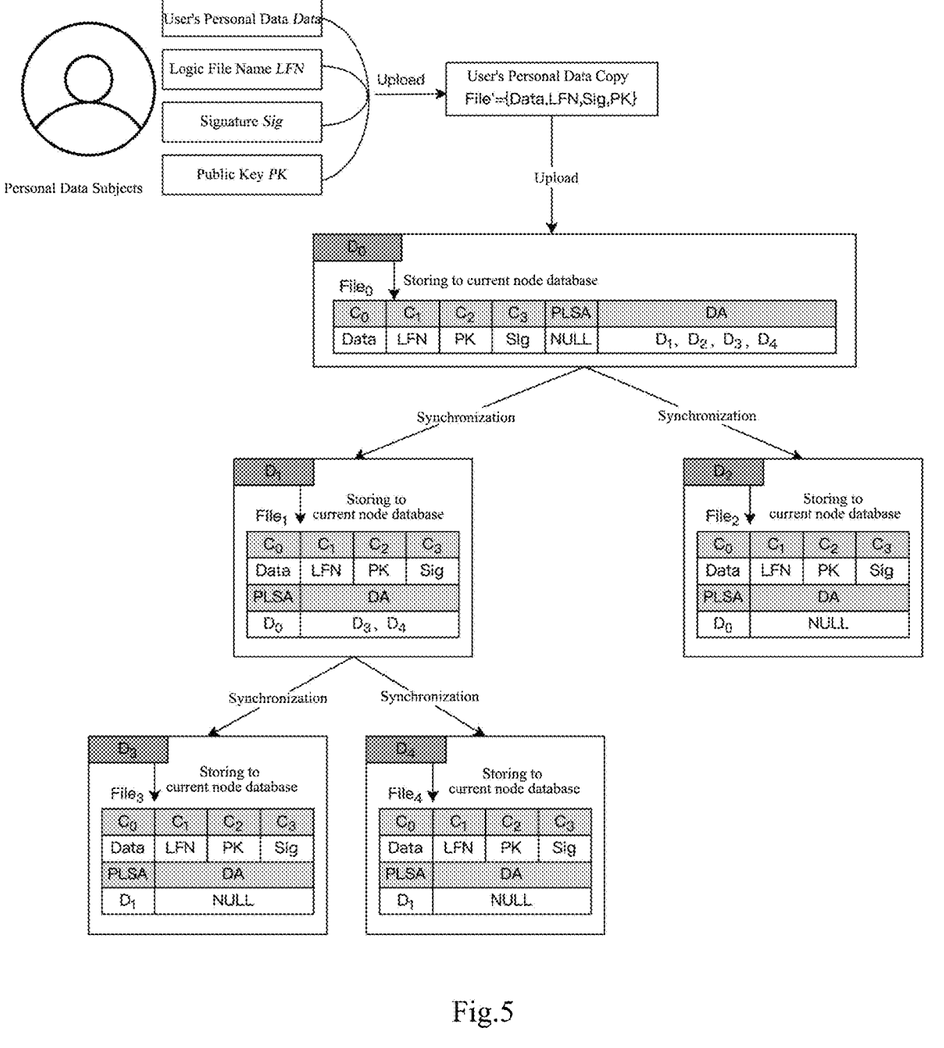
FIG. 5 is a schematic diagram illustrating circulation of associated copies according to another preferred mode of the present disclosure.

According to a preferred mode, a simplified process for storage and circulation of the personal data in one preferred mode of the present embodiment is shown in FIG. 5. Therein, the personal data subject encrypts and packages the personal data Data into a personal data source copy File'={Data, LFN, Sig, PK}, and uploads the encrypted, packaged personal data source copy File' to the data source domain $D_0$. Then the data source domain $D_0$ records any backup copy or save-as copy generated from File' (i.e., a personal data backup copy, written as a personal data copy $File_i$). The propagation domain $D_i$ downloads and analyzes the personal data copy $File_i$ to verify whether the personal data copy File; can be trusted, so as to eventually obtain the personal data Data.

Preferably, the personal data copy File' stores the personal data Data, the logic file name LFN, the digital signature of the personal data subject, and the public key of the personal data subject.

Preferably, the personal data Data refer to identity data created by the personal data subject.

Preferably, the logic file name LFN is the digest of the personal data Data obtained by the personal data subject using the Hash algorithm. The digest is determined by the personal data Data. For different personal data subjects, the personal data Data are different, and the logic file names LFN obtained therefrom are different. In other words, for a personal data subject, the logic file name LFN remains the same for all personal data copies in the network. That is, the logic file name LFN acts as the globally unique identifier for all the personal data copies stored in different propagation domains. More specifically, the logic file name LFN=Hash (Data), Hash(Data) is the Hash value of the personal data Data calculated using the Hash algorithm. Optionally, the algorithm used to calculate the Hash value may be SM3.

Preferably, the digital signature of the personal data subject is obtained by the personal data subject based on the Hash value of the personal data Data through performing digital signature using the private key SK of the personal data subject. Optionally, the personal data subject may sign the Hash value of the personal data Data using SM2, thereby obtaining the digital signature of the personal data subject.

Preferably, the public key PK is set by the personal data subject independently. The public key and the private key are essentially in pair. In other words, for encryption and decryption or digital signing and unsigning, the personal data subject sets a public-private key pair (PK, SK). Therein, the private key is kept by the personal data subject while the public key is published to the data source domain $D_0$ and all the propagation domains $D_i$. In the present disclosure, the public key is used to unsign the signed Hash value of the personal data Data, so as to get the digest of the personal data Data.

According to a preferred mode, every personal data copy File; records data related to the personal data source copy File', including the source address PLSA from which the personal data copy is received and the destination address DA to which the personal data copy is passed on, in addition to the personal data Data, the logic file name LFN, the digital signature Sig, and the public key PK in the personal data source copy File'.

Preferably, both the source address and the destination address record addresses of data domains. Therein, for a certain data domain (i.e., the current propagation domain), the superior data domain from which it receives the personal data copy is referred to as its source domain, and the source address records the address of the source domain. For the same certain data domain, the inferior data domain to which it copies, backs up and transmits the personal data copy is referred to its propagation domain $D_i$, and the destination address records the address of the propagation domain $D_i$.

Preferably, for personal data copies having the same logic file name LFN, or, personal data copies of the same personal data subject, in a typical case, a given data domain is only associated to one source domain, yet its associate propagation domains $D_i$ may be plural. To be brief, one data domain usually acquires the personal data copy from only one superior data domain and may legally share the personal data copy to many inferior data domains.

Preferably, in a typical case, the personal data subject packages the personal data Data into the personal data source copy and uploads it to the data source domain $D_0$. The data source domain $D_0$ possesses the initial personal data copy $File_0$. The personal data copy $File_0$ of the data source domain $D_0$ does not exist in the superior source domain, so the source address PLSA in the personal data copy $File_0$ of the data source domain $D_0$ is NULL.

Preferably, in a typical case, every data domain can legally share the personal data copy to its propagation domains $D_i$. Of course, there are some data domains that do not share the personal data copy to an inferior domain. In this case, there is not an inferior propagation domain $D_i$, so the destination address DA in the personal data copy of such a data domain is NULL.

According to a preferred mode, the destination address DA recorded in the personal data copy $File_0$ of the data source domain $D_0$ contains the addresses of all the data domains sharing the personal data copy, and the data source domain $D_0$ packages all the addresses listed in the destination address DA and its own address into a destination address list $AddList_1$ to be sent to the personal data subject.

Preferably, when some data domain shares the personal data copy to an inferior domain, the destination address of the personal data copy of the data domain is updated at the same time. After the destination address is updated, the data domain feeds the updated destination address back to the superior source domain. The data domain, after receiving the destination address data of the propagation domain $D_i$, compares the received destination address data and its own destination address data, and adds the addresses present in the received destination address data but absent from its own destination address data into its own destination addresses. The updated destination addresses are then fed back to the superior domain until the destination address in the personal data copy in the data source domain $D_0$ is updated.

Figure 7:
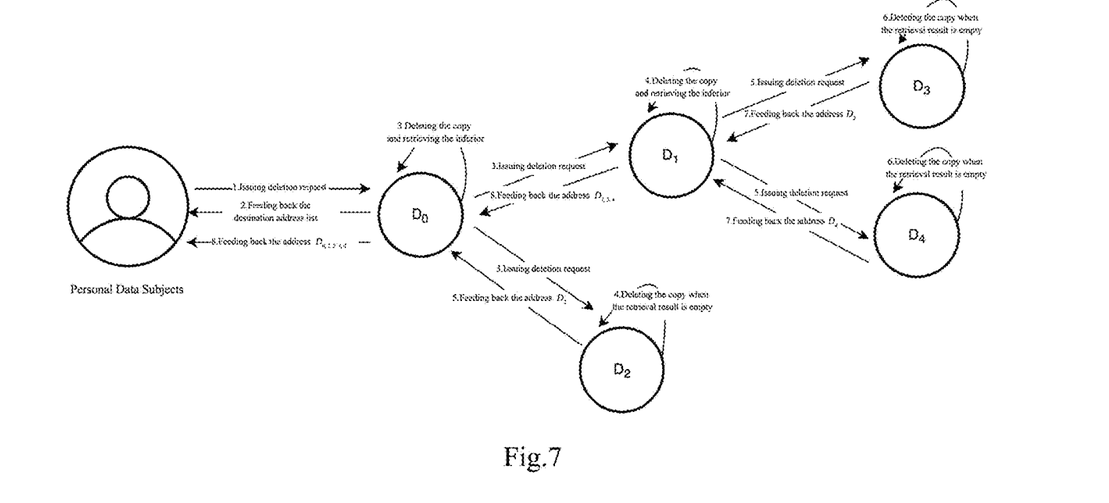
FIG. 7 is a schematic diagram illustrating deletion of associated copies according to another preferred mode of the present disclosure.

According to a preferred mode, a simplified process for deletion and deletion deposit according to a preferred mode of the present embodiment is shown in FIG. 7. Therein, when the personal data subject issues a request for deletion of the personal data copy, the request is sent to all the data domain holding a personal data copy of the personal data subject. When a data domain fulfills the deletion instruction, it adds its own address to the deletion address list $AddList_2$ and fed the deletion address list $AddList_2$ back to the superior source domain.

Preferably, in response to the deletion instruction from the personal data subject, a data domain whose destination address DA=NULL takes the lead to perform deletion, and the data domain creates a deletion address list $AddList_2$.

Preferably, every data domain, after receiving the deletion address lists fed back by all the propagation domains $D_i$, combines the deletion address lists $AddList_2$ of the propagation domains $D_i$ into a new deletion address list $AddList_2$, and, upon completion of the deletion, adds its own address to the deletion address list $AddList_2$ before feeding it back to the superior source domain, until deletion and feedback are conducted all the way to the data source domain $D_0$. The data source domain $D_0$ similarly combines the received deletion address lists AddList$_2$, and after its deletion operation adds its own address to the combined deletion address list AddList$_2$. At last, the data source domain D$_0$ sends the final deletion address list AddList$_2$ to the personal data subject.

According to a preferred mode, the personal data subject, after receiving the fed back deletion address list AddList$_2$, compares the deletion address list AddList$_2$ and the destination address list AddList$_1$. If the destination address list AddList$_1$ and the deletion address list AddList$_2$ are consistent, it means that all the personal data copies have been deleted. If the destination address list AddList$_1$ and the deletion address list AddList$_2$ show any difference therebetween, the personal data subject may locate the difference between the destination address list AddList$_1$ and the deletion address list AddList$_2$ and instructs the data domain at this address to delete the personal data copy down there.

According to a preferred mode, every data domain verifies the acquired personal data copy to ensure the acquired personal data Data are not tampered.

Preferably, the propagation domain D$_i$ downloads the personal data copy shared by the source domain according to needs and based on the logic file name LFN having the globally unique identifier.

Figure 6:
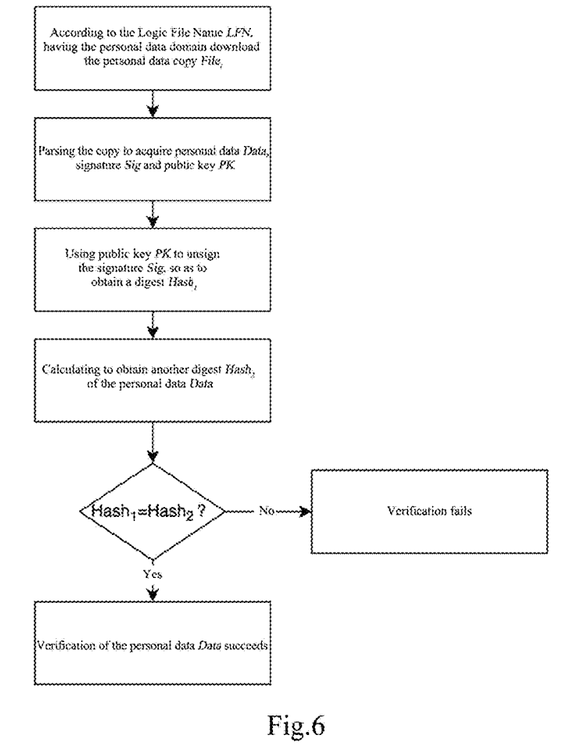
FIG. 6 is a flowchart showing access to associated copies according to another preferred mode of the present disclosure.

Preferably, according to a preferred mode of the present embodiment, a simplified process for accessing the personal data copy and verifying the access is shown in FIG. 6. Therein, when the propagation domain D$_i$ accesses the personal data copy of the personal data subject, it first analyzes the personal data copy to acquire the signature, and then uses the public key of the personal data subject to verify the signature. Specifically, it first analyzes the personal data copy to acquire the digital signature of the personal data subject, and then uses the public key of the personal data subject to unsign its digital signature, so as to obtain the digital digest of the personal data Data (i.e., the Hash value of the personal data Data). Then the same Hash operation is performed of the personal data copy so as to generate a new digital digest. At last, the Hash values of the two digests are compared. If they are the same, the verification succeeds, or otherwise, it fails.

Embodiment 3

The present embodiment provides improvements and supplements on the basis of Embodiment 1 and Embodiment 2, so the description of similarities is not repeated herein.

The present embodiment further provides a system for deleting multi-copy personal data efficiently and securely, which comprises a plurality of data domains. The data domains are configured at least with the following protocols:

a storage protocol, for signing and uploading the personal data and an identifier of a personal data subject to the data domains, so that the data domains store the personal data along with the subject identifier as personal data copies;

a circulation protocol, for having the personal data copies, with its source and destination recorded therein, circulated among the data domains;

an access protocol, for the data domain to perform verification and access on the personal data copy based on the identifier of the personal data subject; and a deletion-and-deposit protocol, for when any of the data domains receives a deletion instruction, having the data domain transmit the deletion instruction to all of the relevant data domains based on the identifier of the personal data subject and destination data in the personal data copy and perform deletion; and after the data domain completes the deletion, having the data domain deposit a domain identifier of itself and feedback data it receives into a log, and feed the log back to its superior data domain.

Preferably, in the system, a data domain refers to an organization that independently determines its purposes and methods for treating personal data (including collection, storage, use, processing, transmission, provision, publication, and deletion of personal data). Specifically, a data domain may be regarded as a server for collecting, storing, using, processing, transmitting, providing, publishing, and deleting personal data.

Preferably, a data domain in the disclosed system at least integrates a personal data copy storage and management module that is loaded with the storage protocol, the circulation protocol, and the access protocol, and a log deposit module that is loaded with the deletion-and-deposit protocol. Signal communication among the data domains is achieved wirelessly.

Preferably, the disclosed system may be used among internet-based businesses or within such a business.

In practical use, when an individual user as a personal data subject uses social software, the individual user authorizes the social software to collect his/her personal data, and the individual user may further use third-party software in collaborative relationship with the social software through the social software. In this case, the third-party software will acquire personal data of the individual user through the social software. For example, each software offered by Tencent, such as WeChat and QQ, maintains a third-party data sharing list, and any third-party platform in the list is enabled to get authorization to use personal data without having a separate notice to the relevant personal data subject, thereby achieving multi-copy data sharing with respect to the personal data subject.

When the foregoing situation is realized in the disclosed system, social software, such as WeChat or QQ or another one for a user to log in with verification using a password or the like is the data source domain among the data domains, and a third-party platform listed in the third-party data sharing list is a propagation domain. Therein, the social software WeChat or QQ and all the third-party platforms in the sharing relationship with the social software are collectively referred to as the data domains in the disclosed system.

More particularly, the social software like WeChat or QQ provides a personal data acquiring port for its associated third-party applets so that a third-party applet, with the consent of a personal data subject, is authorized to acquire a designated part of personal data of the personal data from the social software. At this time, WeChat or QQ is the data source domain, and the third-party applet is the propagation domain.

As another example, it is a common practice that an enterprise builds up a tree-like system of logically connected servers. In such a system, a personal data subject may upload his/her personal data to the master server, and other servers may ask for the personal data of the personal data subject from their superior servers. Herein, the master server is the data source domain as defined in the present disclosure, and the other servers are propagation domains. The master server and the other servers are collectively referred to as data domains in the disclosed system.

Based on the preferred mode as described with reference to Embodiment 1, the disclosed system has its data domains configured as below.

According to a preferred mode, the personal data copy storage and management module of a data domain is at least loaded with a storage protocol. The storage protocol is configured with at least the following algorithms:

Signature(Hash(UserID||Data),SK)→Sig: the personal data subject uses the Hash algorithm to calculate the Hash value Hash(UserID||Data) of the personal data Data and the identifier of the personal data subject UserID, and uses the private key SK to sign Hash(UserID||Data) to obtain the digital signature Sig. Meanwhile, the identifier of the personal data subject UserID is used as the globally unique identifier.

Upload(UserID, Data, Sig): the identifier of the personal data subject UserID, the personal data Data, and the digital signature Sig are uploaded to the personal data source domain $D_0$ as requested. Then the personal data source domain $D_0$ stores these contents together with the source domain identifier Sour and the destination domain identifier Des as $File_0$. In other words, $File_0$ contains the identifier of the personal data subject UserID, the personal data Data, the signature Sig, the source domain identifier Sour, and the destination domain identifier Des. Therein, Sour and Des are initialized as empty.

According to a preferred mode, the personal data copy storage and management module of the data domain is at least loaded with a circulation protocol. The circulation protocol is at least configured with the following algorithms:

Request(UserID): the personal data propagation domain $D_i$ applies for retaining the personal data copy $File_{i-1}$ of the identifier of the personal data subject UserID before the superior domain $D_{i-1}$, and then stores and updates the related data into this node as $File_i$. Specifically, the personal data propagation domain $D_i$ copies UserID, Data, and Sig in the copy $File_{i-1}$, and updates Sour, Des, so as to alter Sour into $D_{i-1}$, and alter Des into empty.

Feedback(UserID, $D_i$): after the storage is completed, the personal data propagation domain $D_i$ feeds its own domain identifier and the destination domain identifier back to the superior domain $D_{i-1}$, which receives the feedback and calls for Modify to conduct related operations. The foregoing process is repeated until the source domain Do receives the feedback.

Modify(UserID, $D_i$, DA'): the domain $D_{i-1}$ alters the destination domain identifier Des' of the copy $File_{i-1}$ by adding Des" present in the set $D_i$∨Des' but absent from the set Des into the destination domain identifier, i.e., Des"=(Des'∨$D_i$)–Des. This associates the multiple copies of the personal data.

According to a preferred mode, the personal data copy storage and management module of a data domain is at least loaded with an access protocol. The access protocol is at least configured with the following algorithms:

Download(UserID): the personal data domain $D_i$, according to the identifier of the personal data subject UserID, downloads the personal data copy $File_i$.

Verify($File_i$): when the personal data domain $D_i$ accesses the personal data copy $File_i$, it first analyzes the copy to acquire the signature, and then uses the public key of the personal data subject to verify the signature.

Decapsulate($File_i$): after the verification using Verify succeeds, the personal data copy is unsigned, so as to eventually obtain the personal data Data.

According to a preferred mode, the deletion-and-deposit protocol of the data domains need to be co-loaded by the personal data copy storage and management module and the log deposit module. The deletion-and-deposit protocol is at least configured with the following algorithms:

DelReq( ): the personal data subject sends a deletion request, and the personal data source domain $D_0$, after receiving the deletion request, sends the deletion request to the directly associated personal data domains in the destination domain identifier according to the identifier of the personal data subject UserID and the destination domain identifier, and then deletes the personal data copy $File_0$.

Del( ): every personal data propagation domain $D_i(i>0)$ receiving the deletion request sends the deletion request to its directly associated personal data domains in the destination domain identifier, and deletes the personal data copy $File_i$. The previous operation is repeated until the destination domain identifier becomes empty.

DelRecord( ): every propagation domain $D_i(i>0)$, after completing the deletion, further needs to deposit a log for the multi-copy deletion process. The log contains the identifier of the personal data subject UserID, its own domain identifier $D_i$, and the domain identifier DList in the signature contents it receives from the inferior domain. Specifically, for the propagation domain $D_i$, after completing the deletion, if the destination domain identifier is empty, the content of the log of the propagation domain $D_i$ is $D_i$||UserID. If the destination domain identifier is not empty, it receives the signature fed back by the inferior domain, and uses the public key of the inferior propagation domain to decrypt the signature, thereby obtaining DList||UserID. Then the content of the deposited log is $D_i$||DList||UserID. Afterward, DelFeedback is called for and used for subsequent operations.

DelFeedback( ): After the log is deposited, every domain signs and feeds back the contents of the log to the superior domain. Specially, for the personal data source domain $D_0$, this step is not performed.

Based on the preferred mode described reference to Embodiment 2, the data domains in the disclosed system are configured as below.

According to a preferred mode, in the stage of sharing and storing the personal data, the data domain at least uses the following algorithms:

the digital signature algorithm Signature(Hash(Data), SK);
the uploading algorithm Upload(Data, LFN, Sig, PK);
the destination address recording algorithm AddRecord ($File_{i-1}$, PLSA, DA); and
the destination address list updating algorithm AddFeedback(PLSA, DA).

Preferably, in order to execute the digital signature algorithm Signature(Hash(Data), SK)→Sig, the personal data subject uses the Hash algorithm to calculate the Hash value Hash(Data) of the personal data Data, and uses the private key SK to sign Hash(Data), so as to obtain the digital signature Sig. Meanwhile, the Hash value Hash(Data) is used as its logic file name LFN, so as to ensure all the same personal data copies stored in the data domain have the globally unique identifier.

Preferably, in order to execute the uploading algorithm Upload(Data, LFN, Sig, PK), the personal data subject uploads the personal data copy File' to the personal data source domain $D_0$. The File'contains the personal data Data, the logic file name LFN, the signature Sig, and the public key PK.

Preferably, in order to execute the destination address recording algorithm AddRecord($File_{i-1}$, PLSA, DA), the data domain, after receiving the personal data copy $File_{i-1}$, stores and updates the related data into this node as the personal data copy $File_i$. Specifically, the personal data Data, the logic file name LFN, the digital signature Sig, and the public key PK in the copy $File_{i-1}$ are stored, and the source address PLSA and the destination address DA are updated. After storage is completed, and the data domain feeds back its own address to the superior data domain. The superior data domain, after receiving the feedback, calls for the AddFeedback to perform related operations. The personal data copy $File_i$ contains the personal data Data, the logic file name LFN, the digital signature Sig, the public key PK, the source address PLSA, and the destination address DA. Particularly, the personal data copy File' does not contain the source address PLSA and the destination address DA. The source address PLSA in the personal data copy $File_0$ related to the data source domain $D_0$ is NULL.

Preferably, in order to execute the destination address list updating algorithm, the data domain alters the destination address list by adding new inferior data domain addresses to the destination address list, so as to associate multiple copies of the personal data.

According to a preferred mode, in the stage of verifying personal data access, the data domain at least uses the following algorithms:
the shared copy downloading algorithm Download(LFN);
the verification algorithm $Verify(File_i)$; and
the unsigning algorithm $Decapsulate(File_i)$.

Preferably, in order to execute the shared copy downloading algorithm Download(LFN), the data domain $D_i$ downloads the personal data copy $File_i$ according to the logic file name LFN.

Preferably, in order to execute the verification algorithm $Verify(File_i)$, when the data domain accesses the personal data copy of the personal data subject, it first analyzes the copy to obtain the signature, and then uses the public key of the personal data subject to verify the signature.

Preferably, in order to execute the unsigning algorithm $Decapsulate(File_i)$, after the verification using the Verify algorithm succeeds, the personal data copy is unsigned so as to eventually obtain the personal data Data.

FIG. 3 illustrates the process of verification of personal data access according to the present disclosure. The process comprises the following steps:
having the executing unit call for the shared copy downloading algorithm Download(LFN) in the algorithm unit to download the personal data copy;
having the executing unit preliminarily analyze the downloaded personal data copy, so as to obtain the personal data, the digital signature, and the public key packaged in the personal data copy; and
having the executing unit call for the verification algorithm $Verify(File_i)$ in the algorithm unit, and use the public key stored in the personal data copy to unsign the digital signature, so as to obtain a digest $Hash_1$ of the personal data; and using the same Hash algorithm to calculate the obtained personal data so as to obtain another digest $Hash_2$ of the personal data; and comparing the digests $Hash_1$ and $Hash_2$, so that if $Hash_1=Hash_2$, the verification succeeds, or otherwise, the verification fails.

If the verification succeeds, the unsigning algorithm Decapsulate(Filet) in the algorithm unit is called for by the executing unit to unsign the personal data copy, so as to eventually obtain the personal data Data.

According to a preferred mode, in the stage of deleting the personal data, the data domain at least uses the following algorithms:
the deletion algorithm Delete( );
the address index algorithm Search(LFN, DA);
the deletion address list updating algorithm DeleteFeedback(LFN, DA); and
the address comparison algorithm Compare ($AddList_1$, $AddList_2$).

Preferably, in order to execute the deletion algorithm Delete( ), the personal data subject issues a deletion request, and the algorithm acquires the logic file name LFN of the personal data copy and the destination address list $AddList_1$.

Preferably, in order to execute the address index algorithm Search(LFN, DA), the data domain, after receiving the deletion request, issues the deletion request to the associated data domains in the destination address list according to the logic file name LFN of the personal data copy and the destination address list.

Preferably, in order to execute the deletion address list updating algorithm DeleteFeedback(LFN, DA), the data domain, after receiving the deletion request, deletes the personal data copy and packages its own address and the received feedback address into an address list $AddList_2$ to be fed back to the superior data domain. Specifically, for the personal data source domain, the address list $AddList_2$ has to be fed back to the personal data subject.

Preferably, in order to execute the address comparison algorithm Compare ($AddList_1$, $AddList_2$) the personal data subject compares the address list $AddList_1$ to $AddList_2$, and deletion is determined successful if the two are the same.

In the present embodiment, the selection between the public key encryption algorithm and the Hash algorithm stored in the algorithm unit is not limiting to the implementation of the disclose method. More algorithms may be alternatives enabling the implementation similarly.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof.

What is claimed is:

1. A method for deleting multi-copy personal data efficiently and securely, being executed among data domains, the method comprising:
signing and uploading personal data and an identifier of a personal data subject to the data domains, so that the data domains store the personal data along with the subject identifier as personal data copies;
having the personal data copies, with its source and destination recorded therein, circulated among the data domains;
when any of the data domains receives a deletion instruction, having the data domain transmit the deletion instruction to all relevant data domains based on the identifier of the personal data subject and destination data in the personal data copy and perform deletion; and
after the data domain completes the deletion, having the data domain deposit a domain identifier of itself and feedback data it receives into a log, and feed the log back to its superior data domain;
wherein during the storing step the method further comprises:
performing a Hash operation based on the personal data and the identifier of the personal data subject, and using a private key of the personal data subject to perform a signature operation on a Hash value obtained through the Hash operation, thereby obtaining a digital signature;

wherein the identifier of the personal data subject acts as a globally unique identifier, and having the personal data subject upload the identifier of the personal data subject, the personal data, and digital signature to a data source domain that is the data domain acting as the source of the personal data;

wherein the personal data copy stored in the data source domain as backup at least stores the identifier of the personal data subject, the personal data, the digital signature, a source domain identifier, and a destination domain identifier, wherein the source domain identifier and the destination domain identifier are initialized as empty;

wherein the source domain identifier stores the identifier of the superior data domain from which the current data copy is circulated, and the destination domain identifier stores the identifier of the inferior data domain to which the current data copy is circulated.

2. The method of claim 1, wherein during the circulating step the method further comprises:

having the current propagation domain make a request to the superior domain for backup of the personal data copy based on the identifier of the personal data subject, and alter the source domain identifier and the destination domain identifier in the personal data copy backuped to the current propagation domain, wherein the source domain identifier is altered into the identifier of the superior domain, and the destination domain identifier is reset into empty; and having the current propagation domain feed the destination domain identifier in the altered personal data copy and the domain identifier of itself back to the superior domain as feedback, so that the superior domain updates the personal data copy of the superior domain based on the feedback of the current propagation domain.

3. The method of claim 2, wherein during the circulating step the method further comprises:

the superior domain updates the personal data copy based on the feedback of the current propagation domain through: adding any domain identifier that exists in the feedback but does not exist in the destination domain identifier to the destination domain identifier; and repeating the step of feeding back and updating, until the data source domain completes updating.

4. The method of claim 3, wherein during the deleting and depositing steps the method further comprises:

having the personal data subject send the deletion instruction to the data source domain, so that the data source domain determines the personal data copy to delete based on the identifier of the personal data subject, and sends the deletion instruction to the directly associated data domain based on the destination domain identifier related to the personal data copy; and having the current propagation domain receiving the deletion request identify the current data copy to delete based on the identifier of the personal data subject, send the deletion instruction to the directly associated data domain based on the destination domain identifier of the current data copy, and then delete the current data copy.

5. The method of claim 4, wherein during the deleting and depositing steps the method further comprises:

if the destination domain identifier of the current propagation domain is empty, having the current propagation domain store the identifier of the personal data subject and the domain identifier of itself into the log; or if the destination domain identifier of the current propagation domain is not empty, having the current propagation domain store the identifier of the personal data subject, the domain identifier of the current propagation domain, and the domain identifier recorded in a deposited log that is fed back by the inferior domain to the current propagation domain, into the log.

6. The method of claim 5, wherein during the deleting and depositing steps the method further comprises:

after the current propagation domain deposit the log, having it sign the deposited log using the private key of the current propagation domain, and feed back the signed deposited log to the superior domain; and having the superior domain unsign the deposited log using the private key of the current propagation domain so as to acquire the domain identifier in the log fed back by the current propagation domain.

7. The method of claim 6, wherein while the data domain accesses the personal data copy the method further comprises:

having the current propagation domain download the desired current data copy based on the identifier of the personal data subject;

having the current propagation domain preliminarily analyze the current data copy so as to acquire the digital signature, and select the expected public key based on the identifier of the personal data subject to verify the digital signature; and if verification succeeds, having the current propagation domain unsign the current data copy so as to acquire the personal data.

8. The method of claim 7, wherein every data domain verifies the acquired personal data copy to ensure the acquired personal data Data are not tampered;

the propagation domain $D_i$ downloads the personal data copy shared by the source domain according to needs and based on the logic file name LFN having the globally unique identifier.

* * * * *